(No Model.) 4 Sheets—Sheet 1.

W. HALEY.
Molds for the Manufacture of Pressed Glassware.

No. 239,772. Patented April 5, 1881.

Attest:
O. Walter Fowler
Jno. L. Coudron

Inventor:
Wm Haley
per atty
A. H. Evans & Co.

N. PETERS, PHOTO-LITHOGRAPHER, WASHINGTON, D.C.

(No Model.) 4 Sheets—Sheet 2.

W. HALEY.
Molds for the Manufacture of Pressed Glassware.

No. 239,772. Patented April 5, 1881.

Attest:
Walter Fowler,
Jno. L. Coudron.

Inventor:
Wm Haley,
per atty
A. H. Evans & Co.

(No Model.) 4 Sheets—Sheet 3.

W. HALEY.
Molds for the Manufacture of Pressed Glassware.
No. 239,772. Patented April 5, 1881.

Attest:
Walter Fowler,
Jno. L. Condron.

Inventor:
William Haley
per atty
A. H. Evans & Co.

(No Model.)  
W. HALEY.  
Molds for the Manufacture of Pressed Glassware.  
No. 239,772. Patented April 5, 1881.

Attest:  
Walter Fowler,  
Jno. L. Condron.

Inventor,  
William Haley  
per attys  
A. H. Evans & Co.

UNITED STATES PATENT OFFICE.

WILLIAM HALEY, OF PITTSBURG, PENNSYLVANIA.

MOLD FOR THE MANUFACTURE OF PRESSED GLASSWARE.

SPECIFICATION forming part of Letters Patent No. 239,772, dated April 5, 1881.

Application filed February 16, 1881. (No model.)

*To all whom it may concern:*

Be it known that I, WILLIAM HALEY, of Pittsburg, Allegheny county, Pennsylvania, have invented a new and useful Improvement in Molds for the Manufacture of Pressed Glassware, of which the following is a clear, full, and exact description, reference being had to the accompanying drawings, making a part of this specification, in which—

Figure 1:
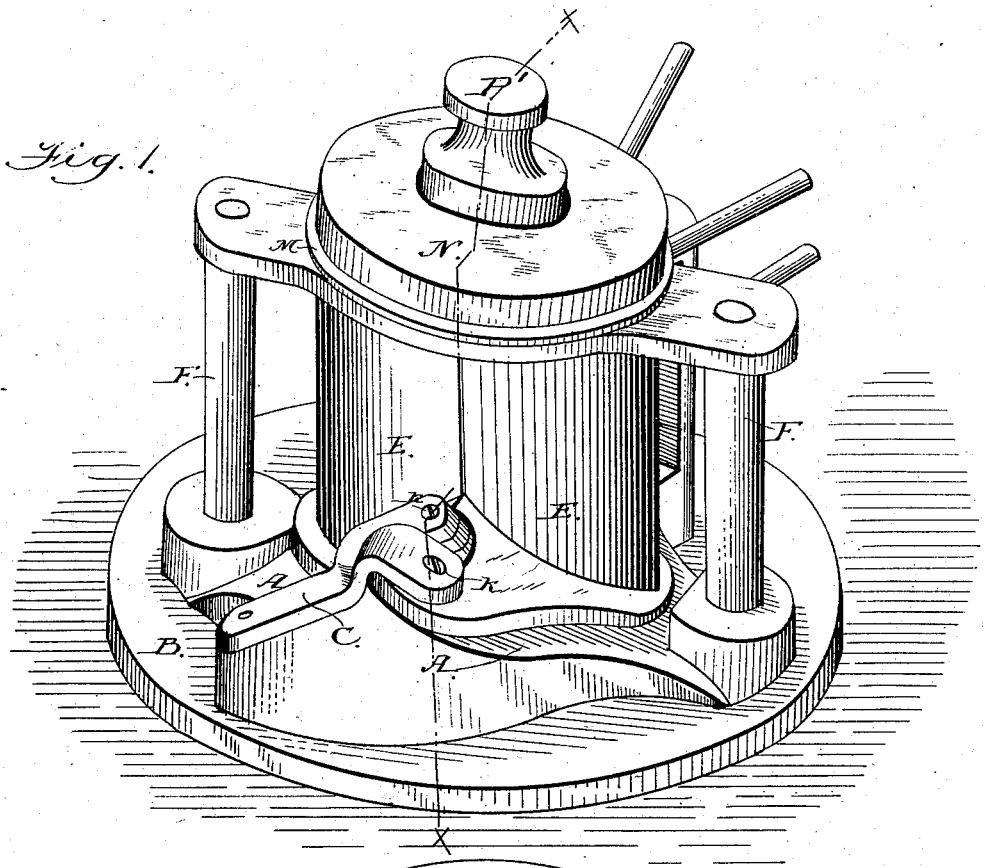
Figure 2:
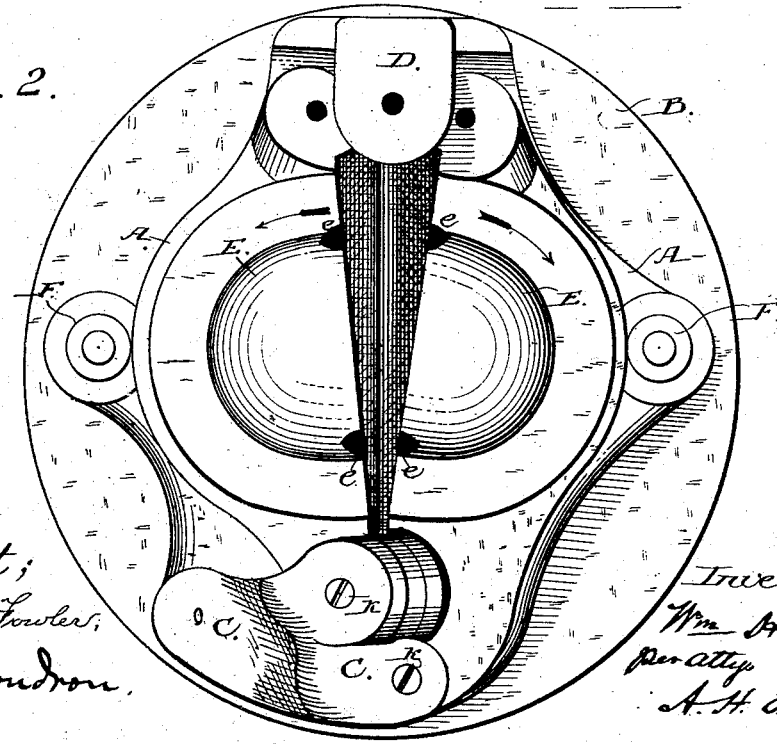
Figure 3:
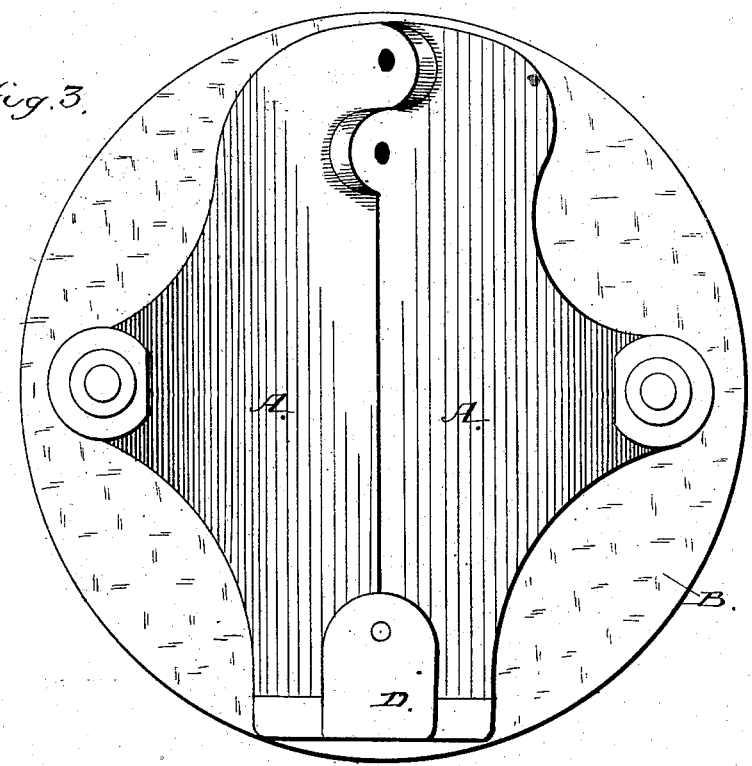
Figure 4:
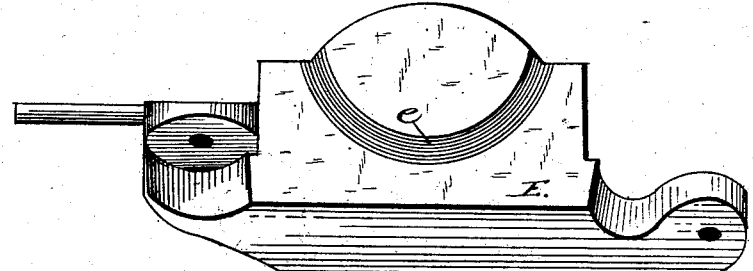
Figure 5:
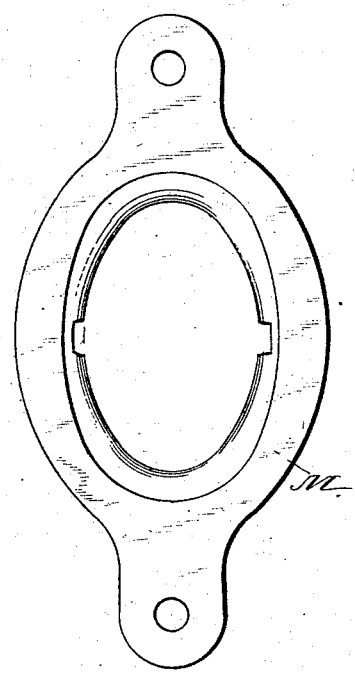
Figure 5:
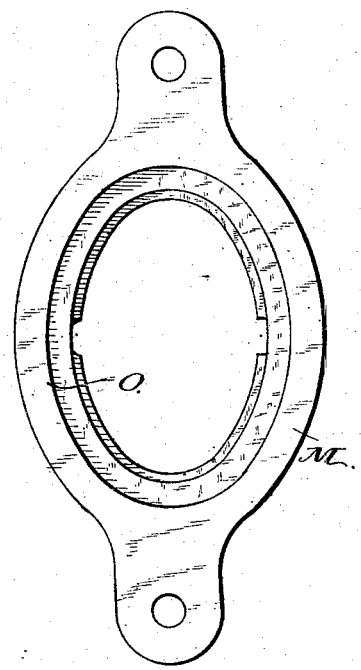
Figure 7:
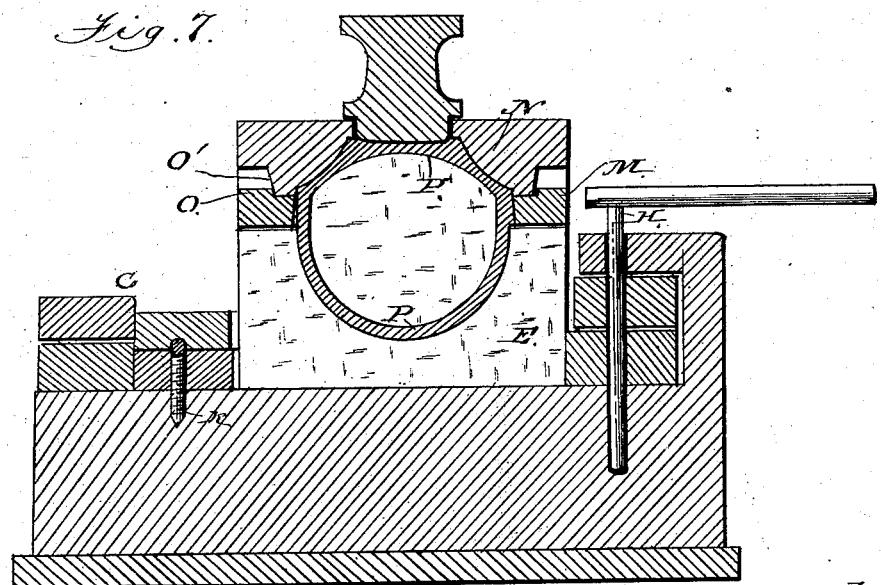
Figure 6:
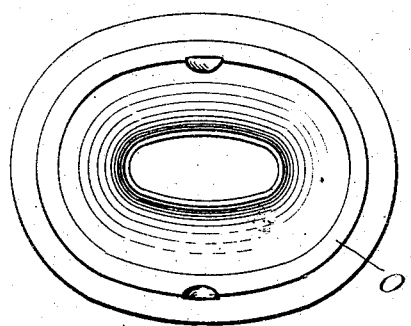
Figure 8:
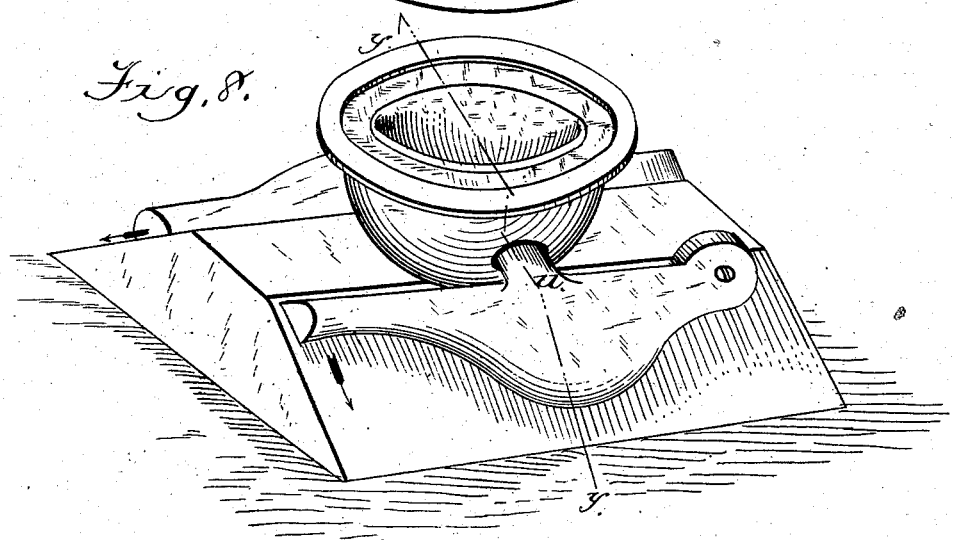
Figure 9:
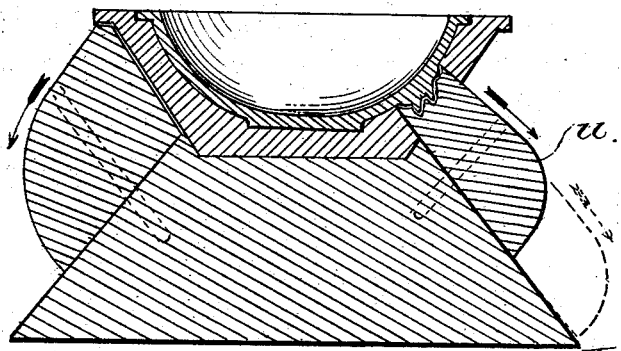

Figure 1 is a perspective of a pressed-glassware mold with my improvements attached. Fig. 2 shows the body of the mold opened, and with upper portions removed. Fig. 3 shows the beveled plate upon which slide the hinged parts of the mold, as hereinafter described. Fig. 4 shows the hinged parts of a mold for making a basket detached from the sloping or beveled plate. Fig. 5 shows the reversed sides of the ring in which the basket or article of ware rests after being pressed. Fig. 6 shows the reversed sides of the plate which forms the body part of the basket. Fig. 7 is a vertical section through the line $x$ $x$ of Fig. 1. Fig. 8 is a perspective view of a part of a mold for making figures in relief. Fig. 9 is a cross-section of the same.

To enable others skilled in the art to make and use my invention, I will proceed to describe the exact manner in which I have carried it out.

The object of my invention is the manufacture of articles of pressed glassware having handles thrown across in bow form from outside to outside edge or rim, and all articles having a sloping projection, such as baskets with inclined sides and with handles, bowls or dishes with rounded edges sloping outwardly or inwardly, or scalloped, and stem-ware of all descriptions having sloping sides or projections, and which descriptions of pressed glassware cannot now be made by any molds known to the trade, as all molds now in use open on a level plane, as shown in patent No. 234,564, issued to me November 16, 1880.

My present invention consists in the novel movement of a mold, or of its parts, on an inclined plane, thereby allowing the mold to recede or open from under articles of pressed glassware having sloping projections or rounded scalloped edges, or stem-ware with sloping projections or projecting figures of any kind.

In the drawings I have shown a mold for making a pressed-glass basket.

I am aware that baskets in glass have been made by the process now in use and operated by Messrs. Atterbury & Co.; but the construction of their mold prevents such articles being made with facility and profit. By my invention all the class of articles before named can be made as cheaply and with as much facility as any of the ordinary articles of glassware.

A in the drawings represents the inclined or double inclined plate, over which move the parts E E as they recede or fall away from the molded article. By thus allowing the parts of the mold to descend on the incline as they are moved away from the atircle molded, the projections on the molded article are freed from the mold without injury, while molds moving on a horizontal plane, as at present constructed, could not be freed from curved projections on the glassware, and on opening the molds the ornamental projections would be damaged or destroyed. This is best illustrated in Fig. 9, where the dotted line indicates the line of travel of the mold as it drops away from the projecting figure formed on the ware.

B is the base-plate, on which the structure rests.

C is a cap or strengthening-piece for hinging the parts E E in position on the double inclined plate A, the screws $k$ $k$ acting as pivots, on which the parts E E swing in opening and closing.

D is a bent arm, rising up in front of the plate A, to hold the key H, which locks together the parts of the mold when closed. Between the sections E E is formed the mold $e$ for the handle of the basket or other similar articles.

F F are supports, on which rest the ring M, which retains the molded article of glassware suspended, ready to be lifted out at the will of the operator after the sections E E have been moved away and down the inclined sides of the plate A.

The body of the basket is formed bottom-upward in the part N, which may also be made in sections, if desired, to suit different articles of ware.

The flange O on the inside of the ring M, and the projection O' on the under side of the part N, form a joint or head around the edge of the basket P, or other article which may be in the mold. The plunger P' is passed through the central opening in the part N, and is used for forcing the glass into all parts of the mold.

In figures 8 and 9 I show my double inclined plate in connection with a part of a mold for making ware with figures in relief. The section U, moving over one of the inclines, contains a mold or die with a human head having a downwardly-projecting nose and chin.

In Fig. 9 it will be seen that as the mold or die is moved away on a downward incline the figure is left in perfect form, which could not possibly be the case if the die moved on a horizontal plane, as move all dies now in use for the manufacture of pressed glassware. I am thus enabled to make all such downward projections, whether in faces, figure-work, or other designs, and ornament pressed glassware with the same ease and facility that the plainest ware is made, with no additional cost.

I am aware that designs may be made by devices now in use, and therefore I do not broadly claim making such ornamentation; but What I do claim as new, and desire to secure by Letters Patent, is—

1. In the manufacture of pressed glassware, a mold in which the sections, when opened, move down an incline as they recede from the article molded, substantially as and for the purpose stated.

2. In a mold for the manufacture of pressed glassware, the inclined plate A, in combination with the hinged sections E E, substantially as and for the purpose set forth.

3. In a mold for the manufacture of pressed glassware, the plate A, having a beveled or inclined plane, on which the mold opens and closes, such bevel or incline corresponding to the bevel or incline of the inside or outside projection of the articles to be made.

4. In a mold for the manufacture of pressed glassware, the plate A, in combination with the sections E E, provided with an opening between them for molding or pressing a handle in bow form, from outside to outside surface or edge of basket or other article of glassware.

5. The combination, with beveled plate A, provided with the pillars F F, of the ring M, mold N, and plunger P', all constructed to operate substantially as and for the purpose set forth.

WILLIAM HALEY.

Witnesses:
J. H. SORG,
JOSEPH BLACKSHAW.